Aug. 19, 1969 P. H. DEVANNEY ETAL 3,461,775
VALVE GUIDE BUSHING MACHINING TOOL
Filed May 9, 1966

INVENTORS
PAUL H. DEVANNEY &
BERNERD D. JACKSON,
BY Yungblut, Melville, Strasser and Foster
ATTORNEYS

United States Patent Office

3,461,775
Patented Aug. 19, 1969

3,461,775
VALVE GUIDE BUSHING MACHINING TOOL
Paul H. Devanney, 3986 Ballard Ave., Cincinnati, Ohio, 45209, and Bernerd D. Jackson, Cincinnati, Ohio; said Jackson assignor to said Devanney
Filed May 9, 1966, Ser. No. 548,733
Int. Cl. B23c 1/20
U.S. Cl. 90—12.5
8 Claims

ABSTRACT OF THE DISCLOSURE

A valve guide bushing machining tool for machining valve guide bushings in engine cylinders so that seals may properly seat thereon and preclude seepage of oil between valve stems and valve guide bushings comprising a cylindrical body, a valve stem pilot and driver secured to said cylindrical body, a cutter which is received by said valve stem pilot and driver, and a cutter locating collar.

---

This invention relates to tool attachments for standard hand motors and the like, and more particularly to a valve guide bushing machining tool.

One of the basic problems with automobile engines concerns the seepage of oil between valve stems and valve guide bushings in engine cylinder heads. To date, various seals, such as, for example, the "Perfect Circle" seal, have been utilized in an attempt to alleviate this difficulty. However, these seals have proved to be unsuccessful, primarily because the valve guide bushings have not been properly machined so as to satisfactorily seat the seals. Tools which are presently used for machining the valve guide bushings so as to attempt to properly seat the seals, such as, for example, a typical fly cutter, utilize a long stem which must be inserted within the valve guide bushings when the valve stems have been removed therefrom, and a reamer which then is rotated to machine the bushing. Even though the stem is used as a centering guide during the machining operation, the machining very often is not satisfactory. Additionally, much labor is expended because the cylinder heads must be removed in order to replace the valve stems which have been removed from their valve guide bushings so that the stem of the machining tool may fit within the valve guide bushings.

With the foregoing considerations in mind, it is an object of the present invention to provide a vastly improved tool for machining valve guide bushings in a satisfactory manner so as to properly seat seals.

Another object of the present invention is to provide a valve guide bushing machining tool which will substantially reduce the amount of labor and time necessary to machine valve guide bushings.

Further, it is an object of the present invention to provide a valve guide bushing machining tool which is very flexible so that it is capable of machining various sizes of valve guide bushings.

Still a further object of the present invention is to provide a valve guide bushing machining tool which may be operated by standard hand motors which are readily available to most mechanics.

Additionally, it is an object of the present invention to provide a valve guide bushing machining tool which is easy to operate and which will machine valve guide bushings to the proper size, the length of cut for the seals being predetermined so that the tool will bottom at the end of a cut.

It is still another object of the present invention to provide a valve guide bushing machining tool whose life and utility is virtually unlimited because its component parts are replaceable.

Finally, it is an object of the present invention to provide a valve guide bushing machining tool which is simple in construction, economical in manufacture, and otherwise well suited to the purpose for which it is designed.

These and other objects of the invention, which will be described in greater detail hereinafter, or which will be apparent to one skilled in the art upon reading these specifications, are accomplished by that certain construction and arrangement of parts of which the following describes an exemplary embodiment.

Reference is made to the drawings forming a part hereof, and in which.

Briefly, in the practice of the invention, the valve guide bushing machine tool comprises a valve stem pilot and driver, the valve stem pilot and driver having a bore therein, the diameter of which substantially conforms with the diameter of a valve stem in the valve guide bushing to be machined, and a cutting end which machines the end of the valve guide bushing to be machined; a cutter body; a cutter which is made to conform to both the inside seal diameter and inside seal length, and which machines the innermost valve seat and outer wall on the periphery of the valve guide bushing being machined; a cutter locating collar nut which holds the valve stem pilot and driver and the cutter securely together; a collar locking nut which assures that the elements are secured together in tight fashion; and a pilot stem secured inside the bore of the valve stem pilot and driver and extending from the tool which enters the bore of the valve guide bushing which is being machined and aids in guiding the operation of the tool.

Referring now in more detail to the drawings, the valve guide bushing machining tool according to the instant invention will be more fully explained.

Figure 1:
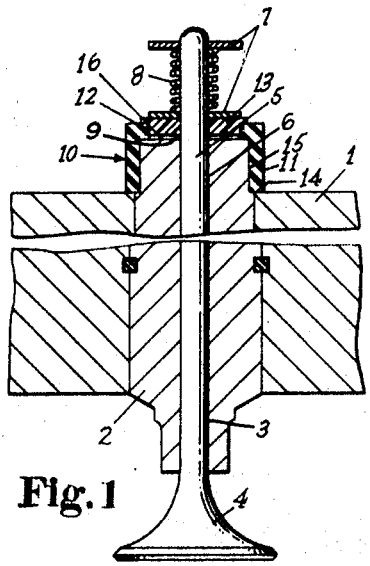
FIGURE 1 is a partial, fragmentary, elevational, cross-sectional view through one valve of an engine cylinder head.

FIGURE 1 shows an engine cylinder head 1 having a valve guide bushing 2, inserted within a bore 3. A valve 4 having a valve stem 5 is slidably fit within the bore 6 of the valve guide bushing 2. The valve stem 5 is held in its proper place by means of the rings 7 and the spring 8. During engine operation, problems arise because of seepage of oil between the valve stem 5 and the bushing 2 at the position 9.

Figure 2:
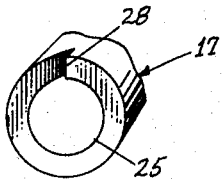
FIGURE 2 is a perspective view of a typical seal.

To date, various seals, shown generally at 10, have been utilized to alleviate this difficulty. A typical seal 10 is shown in FIGURE 2. The seal body 11 is generally of resilient material and a center bore 12 is provided so that the seal will fit around the bushing 2. A nylon ring 13 within the bore 12 fits around the top of the bushing 2 and the valve stem 5 when the seal 10 is in place. The seals 10 have proved to be unsuccessful because the bushings 2 have not been properly machined at three important locations: the inner valve seat 14, the wall 15, and the bushing end 16, so as to satisfactorily seat the seals 10.

A fly cutter is a typical tool which is presently used for machining valve guide bushings. This tool is provided with a long center stem which must be inserted within the bore 6 in the bushing 2 when the valve stem 5 has been removed. A reamer then shaves the bushing 2. Even though a long stem is used as a centering guide during the machining operation, the machining very often is not adequate. Additionally, much labor is required because it is necessary that the valve 4 be completely removed from its bushing 2 in order for the bore 6 of the bushing 2 to completely receive the long stem of the fly cutter. In order to replace the valve 4 upon completion of the machining operation, it is necessary to remove the engine cylinder head 1, an operation which requires the expenditure of much labor and time.

Figure 3:
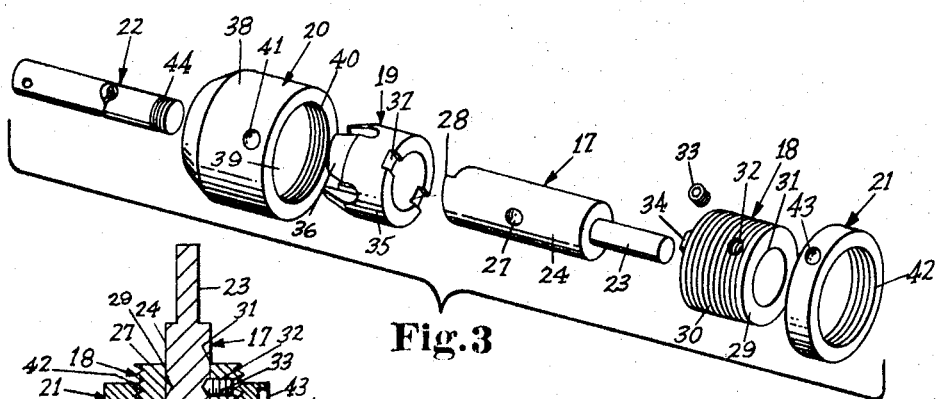
FIGURE 3 is an exploded perspective view of a valve guide bushing machining tool according to the instant invention.

FIGURE 3 is an exploded perspective view of a valve guide bushing machining tool according to the instant invention which may be used to accurately machine bushings 2 without the necessity of removing the valve 4 from the cylinder head 1. Additionally, the tool of the instant invention will machine the bushing 2 in the three important areas mentioned earlier (at the positions 14, 15 and 16) so as to achieve a satisfactory fit of the seal 10 on the bushing 2. As can be seen, the tool of the instant invention comprises six elements: a valve stem pilot and driver 17, a cutter body 18, a cutter 19, a cutter locating collar nut 20, a collar locating nut 21, and a pilot stem 22. Each of these elements will be discussed in more detail hereinafter.

Figure 5:
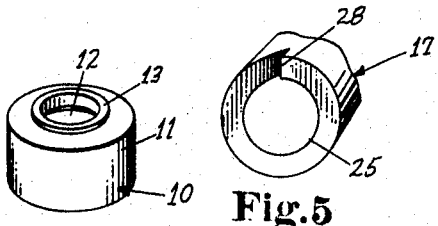
FIGURE 5 is a partial perspective view of the valve stem pilot and driver as seen from the cutting end.

The valve stem pilot and driver 17 comprises a stem portion 23 which is received into a power tool, generally a standard drill motor as will be more fully explained hereinafter, and a larger body portion 24 substantially the diameter of the end 16 of the bushing 2 to be machined and the inside diameter of the seal 10 which is to be used. The body portion 24 has a bore 25 substantially the diameter of the bore 6 in the bushing 2 and the valve stem 5, as best seen in FIGURE 5, and the innermost end of the bore 25 is threaded 26. Two detents 27 are provided on the exterior of the body portion 24. FIGURE 3 shows the location of one detent 27. However, it will be understood that immediately opposite this detent on the surface of the body portion 24 there is a similar detent 27. A cutting edge 28 is provided at the end of the body portion 24 opposite the stem 23. In operation, this is the cutting edge which machines the end surface 16 of the valve guide bushing 2.

Figure 4:
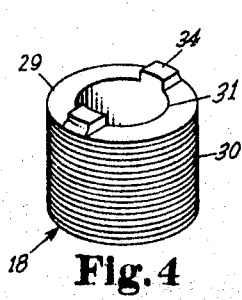
FIGURE 4 is a perspective view of the cutter body.
Figure 6:
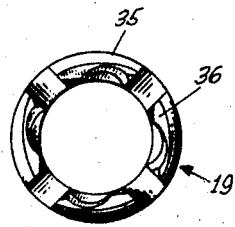
FIGURE 6 is an end view of the cutter as seen from the cutting end.

The cutter body 18 comprises a sleeve or bushing 29, the surface of which is threaded 30. The sleeve 29 has a bore 31 substantially the diameter of the body portion 24 of the valve stem pilot and driver 17. An internally threaded aperture 32 is provided through the sleeve 18 to receive the set screw 33. The set screw 33 may, of course, be threaded into the aperture 32 by means of an Allen wrench. The purpose of the set screw will be more fully explained hereinafter. One end of the sleeve 29 has a keyed portion 34, as best seen in FIGURE 4.

The cutter 19 comprises a ring member 35 having four depending cutting edge teeth 36. The inside diameter of the cutting edge teeth 36 is substantially the same as the inside diameter of the seal 10 and the diameter of the valve guide bushing tool to be machined. The length of the cutting edge teeth 36 is substantially the same as the depth of the cut desired, i.e., the length of the seal 10. In operation, the cutting edge teeth 36 machine both the inner valve seat 14 and wall 15 of the bushing 2.

The ring member 35 of the cutter 19 has an inside diameter substantially the same as the outside diameter of the body portion 24 of the valve stem pilot and driver 17. Additionally, the ring member end portion not having the depending cutting edge teeth 36 is provided with a slot 37 to receive the key 34 on the cutter body 18. It will be understood that the outside diameter of the ring member 35 will be substantially the same as the outside diameter of the threaded sleeve 29.

The cutter locating collar nut 20 comprises a large sleeve 38 having an internal bore 39 of a diameter such that the collar nut 20 will fit over and conform to the surface of the cutter 19 and the cutter body 18. One end of the bore 39 within the collar nut 20 is threaded 40 so that when the collar nut 20 is placed over the cutter 19 it may be secured to the threads 30 on the body portion 29 of the cutter body 18. A detent 41 is provided in the surface of the collar nut 20, the function of which will be more fully explained hereinafter.

A collar locking nut 21 having an internally threaded bore 42 of a diameter to receive the threads 30 on the body portion 29 of the cutter body 18 is provided to aid in tightly securing the elements together. A detent 43 identical with the detent 41 is provided in the surface of the nut 21. As will be explained, the detents 41 and 43 serve as a means by which pin wrenches may be used to tighten the cutter locating collar nut 20 and the collar locking nut 21.

The pilot stem 22 is the same diameter as the valve stem 5 and the bore 6 of the bushing 2 which is being machined. It will be noted that the pilot stem 22 is threaded at one end 44 so as it may be received in the threaded portion 26 in the bore 25 of the valve stem pilot and driver 17. The length of the pilot stem 22 is such as is necessary to guide the tool in the machining operation. It has been found that satisfactory guidance is provided when the pilot stem 22 extends into the bore 6 one-half the length of the valve guide bushing 2.

Figure 7:
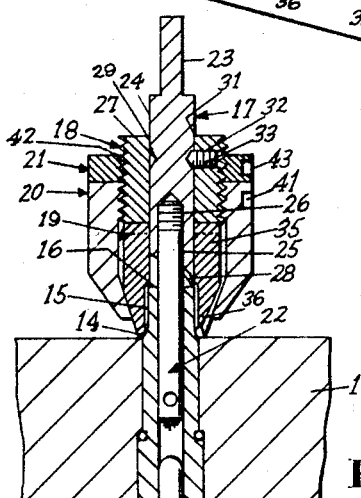
FIGURE 7 is an assembled sectional working view of a valve guide bushing machining tool according to the instant invention.

A partial cross-sectional view of an assembled tool may be seen in FIGURE 7. To assemble the tool, the valve stem pilot and driver 17 is inserted into the bore 31 of the cutter body 18, the keyed portion 34 of the cutter body 18 being in the same direction as the cutting edge 28 of the pilot and driver 17, and one of the detents 27 is aligned with the aperture 32. An Allen wrench is then used to tighten the set screw 33 in the aperture 32 into a detent 27 so as to lock the two elements together. Next, the pilot and driver 17 is inserted into the cutter 19. The keyed portion 34 of the pilot and driver 17 meshes with the slot 37 in the cutter 19. It will be noted that the cutting edge 28 of the pilot and driver 17 enters the ring member 35 of the cutter 19 no further than the beginning of the depending cutting edge teeth 36, the inside diameter of the cutting edge teeth 36 being slightly less than the outside diameter of the body portion 24 of the pilot and driver 17. The cutting edge teeth 36 end of the so far assembled tool is then inserted into the bore 39 of the cutter locating collar nut 20, and the internal threads 40 of the bore 39 mesh with the threads 30 of the cutter body 18. The locking nut 42 is then threaded onto the cutter body 18 and tightened until it is flush with the cutter locating collar nut 20. Finally, the pilot stem 22 is inserted into the threaded portion 26 of the bore 25 in the pilot and driver 24. The assembled tool is secured to a standard drill motor by means of the stem 23.

The operation of machining a valve guide bushing is started by removing a spark plug near the valve guide bushing which is to be machined, and placing an air source into the engine cylinder head. The rings 7 and spring 8 are then removed from the top of the valve stem 5 and the valve 4 drops freely into the bore 6 of the valve guide bushing 2 which is to be machined. It will be understood that the valve stem 5 does not drop out of the bore 6 because of the air pressure against the valve 4. If there is a seal around the valve guide bushing 2 it is removed. The pilot stem 22 of the assembled tool is inserted into the bore 6 of the bushing 2 and the drill motor rotates the tool. As the tool rotates the cutting edge teeth 36 machine the wall 15. When the proper cut has been made, and this is controlled by the length of the teeth 36, the teeth 36 then machine the inner seat 14, and the cutting edge 28 of the pilot and driver 17 machines the end 16 of the bushing tool. After the tool has bottomed, i.e., the end of the cut has been reached, the tool is removed and the air pressure referred to above is increased so that the valve stem 5 of the valve 4 is pushed back through the bore 6 of the bushing 2. The seal 10 is then inserted upon the newly machined valve seat and the rings 7 and spring 8 is placed around the valve stem 5. The rest of the operation is known to a mechanic.

It will be understood that valve guide bushings of various sizes may be machined to receive seals 10 with the tool of the instant invention simply by changing the cutter 19 and the pilot and driver 17. Of course, various cutters having various inside cutting edge teeth 36 diameters and cutting edge teeth 36 lengths may be provided. Also, it will be understood that when a new cutter 19 is provided, a new valve stem pilot and driver 17 having an outside body portion 24 diameter which is substantially the same as the diameter of the valve guide bushing 2 being machined, is also provided.

Additionally, it will be seen that the elements of the tool of the instant invention may be easily replaced when they become worn or broken. This greatly increases the life span and utility of the tool.

It will be understood that modifications may be made without departing from the spirit of the invention and therefore no limitations other than those specifically set forth in the claims are intended or should be implied.

For example, the collar locking nut 21 and the cutter body 18 may be made in one piece. Additionally, the cutter locating collar nut 20, the cutter 19, the cutter body 18, and the valve stem pilot and driver 17 may all be secured together by means of aligned threaded apertures in each element which receive a long set screw. Finally, it is obvious that some other type of mating projection and recess may be used in lieu of the keyed portion 34 of the cutter body 18 and the slot 37 of the cutter 19.

The embodiments of the invention in which an exclusive property or privilege is claimed are defined as follows:

1. A valve guide bushing machining tool to be used as an attachment for motors and the like, each said valve guide bushing being machined for placement of a seal having a bore therein to receive a valve stem of a valve, which comprises, in combination:
   (a) a cylindrical body,
      (1) said cylindrical body having external threads, and
      (2) at least one projection extending from one end thereof;
   (b) a valve stem pilot and driver,
      (1) said driver comprising a shaft portion which is received in said cylindrical body,
      (2) an axial stem portion projecting from one end of said shaft to be driven by said motor,
      (3) a cutting edge disposed at the opposite end of said shaft, and
      (4) an axially located, partially threaded bore in the cutting edge end of said shaft;
   (c) means for securing said valve stem pilot and driver to said cylindrical body;
   (d) a cutter,
      (1) said cutter having a ring member, said ring member having at least one recess at one end thereof, and
      (2) at least one cutting edge tooth depending from the opposite end thereof, said ring member receiving said shaft of said valve stem and driver such that said recess mates with said projection of said cylindrical body; and
   (e) a cutter locating collar, said collar being threaded internally at one end thereof, such that said collar will receive said cutter and said threads of said collar will mate with said threads of said cylindrical body.

2. The tool of claim 1 including:
   (a) a second internally threaded collar which is received by said cylindrical body, said threads of said second collar mating with said threads of said cylindrical body; and
   (b) means for securely tightening said second collar and said cutter locating collar contiguous with each other on said cylindrical body.

3. The tool of claim 1 including a pilot stem, said pilot stem being threaded at one end thereof for mating with said partially threaded bore of said valve stem pilot and driver.

4. The tool of claim 1 wherein said shaft portion of said valve stem pilot and driver is substantially the same diameter as said valve guide bushing, whereby when said motor drives said tool, said cutting edge of said shaft machines the end of said valve guide bushing.

5. The tool of claim 3 wherein both said axially located, partially threaded bore and said pilot stem are substantially the same diameter as said valve stem, whereby said pilot stem is receivable in said bore of said valve guide bushing.

6. The tool of claim 1 wherein said means for securing said valve stem pilot and driver to said cylindrical body comprises:
   (a) at least one recess in said shaft portion;
   (b) a threaded aperture in the wall of said cylindrical body aligned with said recess; and
   (c) a set screw which is receivable by said threaded aperture and which when substantially flush with the surface of said cylindrical body will extend into said recess in said shaft portion.

7. The tool according to claim 1 wherein said cutter has four cutting edge teeth depending from the opposite end thereof, and the inside diameter of said ring member is slightly larger than the inside diameter of said four cutting edge teeth.

8. The tool according to claim 7 wherein the length and inside diameter of said four cutting edge teeth corresponds to the inside depth and inside diameter of said seal.

References Cited
UNITED STATES PATENTS

| | | | |
|---|---|---|---|
| 3,286,552 | 11/1966 | Simmons | 77—2 |
| 1,950,522 | 3/1934 | Seelert | 90—12.5 |
| 1,183,855 | 5/1916 | Clarkson | 90—12.5 |
| 460,956 | 10/1891 | Dottermann | 90—12.5 |

ANDREW R. JUHASZ, Primary Examiner

G. WIEDENFELD, Assistant Examiner

U.S. Cl. X.R.

29—105; 82—1; 90—12